(12) United States Patent
Toya et al.

(10) Patent No.: US 7,830,116 B2
(45) Date of Patent: Nov. 9, 2010

(54) MOBILE ELECTRONIC EQUIPMENT AND BATTERY CHARGER CRADLE

(75) Inventors: Shoichi Toya, Minamiawaji (JP); Yasunari Mizoguchi, Sumoto (JP); Toshiki Nakasho, Sumoto (JP); Kyozo Terao, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 80 days.

(21) Appl. No.: 12/385,831

(22) Filed: Apr. 21, 2009

(65) Prior Publication Data
US 2009/0267559 A1 Oct. 29, 2009

(30) Foreign Application Priority Data
Apr. 24, 2008 (JP) .............................. 2008-114589

(51) Int. Cl.
*H02J 7/00* (2006.01)
(52) U.S. Cl. .................. 320/108; 320/113; 320/115
(58) Field of Classification Search .................. 320/108
See application file for complete search history.

(56) References Cited

U.S. PATENT DOCUMENTS 6,040,680 A * 3/2000 Toya et al. .................. 320/108
7,180,265 B2 * 2/2007 Naskali et al. .............. 320/108
2006/0108974 A1 * 5/2006 Castillo ...................... 320/107
2009/0267560 A1 10/2009 Toya et al.

FOREIGN PATENT DOCUMENTS

| JP | 6-46531 | 2/1994 |
|----|---------|--------|
| JP | 3011829 | 6/1995 |
| JP | 9-63655 | 3/1997 |
| JP | 2001-85068 | 3/2001 |

* cited by examiner

*Primary Examiner*—Edward Tso
*Assistant Examiner*—M'Baye Diao
(74) *Attorney, Agent, or Firm*—Wenderoth, Lind & Ponack, L.L.P.

(57) ABSTRACT

Mobile electronic equipment incorporating an induction coil and a battery; and a battery charger cradle for recharging the battery in the mobile electronic equipment. Regarding the charger cradle, a bottom surface of a mounting portion is curved in a U-grooved shape, and a primary coil is incorporated inside the U-grooved bottom surface, with the primary coil being connected to a power source. Regarding the mobile equipment, its rear surface placed on the mounting portion of the charger cradle is curved to match with the U-grooved bottom surface, and the induction coil is incorporated inside the curved rear surface. When the mobile equipment is placed on the mounting portion of the charger cradle, the electric power is carried from the primary coil to the induction coil which are electromagnetically coupled with each other, and the battery in the mobile equipment is recharged by the electric power induced to the induction coil.

38 Claims, 11 Drawing Sheets

MOBILE ELECTRONIC EQUIPMENT AND BATTERY CHARGER CRADLE

CROSS-REFERENCE TO RELATED APPLICATIONS

The present application is based on Application No. 2008-114589 filed in Japan on Apr. 24, 2008, the content of which is incorporated herein by reference.

BACKGROUND OF THE INVENTION

1. Field of the Invention

The present invention relates to mobile electronic equipment incorporating a rechargeable battery and also relates to a battery charger cradle for recharging a battery incorporated in the mobile electronic equipment.

2. Description of the Related Art

There has been developed a battery charger cradle for recharging a battery incorporated in mobile electronic equipment, where electric power is carried from a primary coil to an induction coil (a secondary coil) by the effect of electromagnetic induction. Refer to Japanese Patent Laid-Open Publication No. H09-63655 (1997) and Japanese Utility Model Registration U-3011829.

Described in Japanese Patent Laid-Open Publication No. H09-63655 (1997) is a structure that the primary coil excited by a high-frequency power source is incorporated in the battery charger cradle and that the induction coil electromagnetically coupled to the primary coil is incorporated in a battery pack. The battery pack also incorporates a circuit in which an alternating current induced to the induction coil is rectified and supplied to the rechargeable battery for a charging operation. In accordance with such structure, the battery pack is placed on the battery charger cradle so that the battery contained in the battery pack can be recharged in a non-contact state.

Also described in Japanese Utility Model Registration U-3011829 is a structure that the battery is contained in the bottom of the mobile electronic equipment and that a secondary-side charging adaptor is provided subjacently to the battery so that the induction coil and charging circuit are incorporated in the secondary-side charging adaptor. Also described is a structure that the primary coil electromagnetically coupled to the induction coil is provided to the battery charger cradle. The mobile electronic equipment coupled to the secondary-side charging adaptor is placed on the battery charger cradle, and the electric power is carried from the primary coil to the induction coil to recharge the battery contained in the mobile electronic equipment.

SUMMARY OF THE INVENTION

The structure described in Japanese Patent Laid-Open Publication No. H09-63655 (1997) presents a drawback that, when the battery pack on the battery charger cradle is out of alignment, the battery pack cannot be charged. This is because when a relative position between the battery pack and the battery charger cradle is out of alignment, the primary coil and the induction coil are not electromagnetically coupled to each other and such state disables AC electric power to be carried from the primary coil to the induction coil. Such drawback can be remedied, as described in Japanese Utility Model Registration U-3011829, when a positioning protrusion is provided to the battery charger cradle and also a complementary positioning recess is provided to the mobile electronic equipment, with the positioning protrusion being fitted in the positioning recess. In such structure, the positioning protrusion is guided into the positioning recess, enabling a relative misalignment to be avoided between the mobile electronic equipment and the battery charger cradle.

The structure disclosed in Japanese Utility Model Registration U-3011829, however, presents a drawback that it is cumbersome to set the mobile electronic equipment in place because the mobile electronic equipment is required to be precisely placed on the battery charger cradle such that the positioning protrusion is guided into the positioning recess. Another drawback presented in this structure is that it is difficult for all users to always set the mobile electronic equipment on the battery charger cradle in a required manner. Even another drawback presented in such structure is that the mobile electronic equipment cannot be made thin enough because the positioning recess is provided at a casing bottom and the induction coil is disposed superjacent to the positioning recess. Since mobile electronic equipment such as a mobile phone is required to be made thinnest possible, an increased thickness caused by the positioning recess presents a drawback that convenient portability is spoiled.

The above-mentioned drawbacks can be overcome when a magnetic field for carrying the electric power to the induction coil is generated over a wide area of entire top surface of the battery charger cradle. This structure, however, also presents a drawback that efficiency decreases in the electricity to be carried from the primary coil to the induction coil because the magnetic field is generated even in a portion where the mobile electronic equipment is not placed. The structure also suffers the disadvantage that when a metallic element such as iron is placed atop of the battery charger cradle, heat is likely to be generated when an electric current flows to the metallic element by the effect of electromagnetic induction.

With the aim of overcoming the above-mentioned drawbacks, the present applicant has developed a battery charger cradle where a primary coil is disposed below a top plate of the battery charger cradle and the primary coil is moved by means of a movement mechanism along an inner surface of the top plate. The battery charger cradle is so designed as to detect a position of mobile electronic equipment placed atop of the top plate and bring the primary coil closer to the induction coil of the mobile electronic equipment by means of the movement mechanism. The battery charger cradle has a position detection controller for detecting a position of the mobile electronic equipment placed on the top plate of a casing, and the movement mechanism is controlled by the position detection controller to move the primary coil closer to the induction coil of the mobile electronic equipment. The battery charger cradle is so designed that the primary coil is brought closer to the induction coil of the mobile electronic equipment and that electric power is carried from the primary coil to the induction coil.

Such structure enables the battery to be recharged even when the position of the mobile electronic equipment is out of alignment. However, the structure suffers the disadvantage that a cost of manufacture becomes higher due to the mechanism for moving the primary coil to match with the position of the induction coil in the mobile electronic equipment and also due to a complicated mechanism of detecting the position of the mobile electronic equipment.

The present invention has been made to further overcome such drawback. It is an object of the present invention to provide mobile electronic equipment and a battery charger cradle, being of a very simplified structure, in which the induction coil of the mobile electronic equipment and the primary coil of the battery charger cradle is efficiently coupled and thus the electric power can be efficiently carried from the battery charger cradle to the mobile electronic equipment to quickly recharge the battery.

Further, another object of the present invention is to provide mobile electronic equipment and a battery charger cradle which can be conveniently used by a user for efficiently recharging the battery of the mobile electronic equipment.

In order to achieve the above-described objects, the mobile electronic equipment and the battery charger cradle of the present invention are composed as follows.

The mobile electronic equipment and the battery charger cradle include: mobile electronic equipment 50 incorporating an induction coil 51 and a battery 54 which is recharged by electric power induced to the induction coil 51; and a battery charger cradle 10 for the mobile electronic equipment 50 to be detachably placed on for recharging the battery 54 contained in the mobile electronic equipment 50. The battery charger cradle 10 is so constructed and arranged that a bottom surface of a mounting portion 12 is a curved bottom surface 13 being curved in a U-grooved shape and that a primary coil 21 being electromagnetically coupled to the induction coil 51 of the mobile electronic equipment 50 is incorporated inside the curved bottom surface 13, with the primary coil 21 being connected to an electric power source 22. The mobile electronic equipment 50 is so constructed and arranged that its rear surface to be placed on the mounting portion 12 of the battery charger cradle 10 is a curved rear surface 53 being in a curved shape of matching with the curved bottom surface 13 being U-grooved and that the induction coil 51 is incorporated inside the curved rear surface 53. To describe the battery charger cradle 10, when the mobile electronic equipment 50 is placed on the mounting portion 12, the electric power is carried from the primary coil 21 to the induction coil 51 which are electromagnetically coupled with each other, and the battery 54 contained in the mobile electronic equipment 50 is recharged by the electric power being induced to the induction coil 51.

The mobile electronic equipment and the battery charger cradle of this structure are distinctive in that, while being in a very simplified structure, the induction coil and the primary coil are electromagnetically coupled in an efficient manner to efficiently carry the electric power from the battery charger cradle to the mobile electronic equipment, thus enabling the battery to be quickly recharged. This is because the bottom surface of the mounting portion is curved and the rear surface of the mobile electronic equipment to be placed on the mounting portion is also curved, so that when the mobile electronic equipment is placed on the mounting portion, a self weight of the equipment guides the curved rear surface to be positioned at the bottom portion of the curved bottom surface. In this manner, since such unique structure enables the curved bottom surface and the curved rear surface to be brought closer to each other and guided in place, the induction coil incorporated inside the curved bottom surface is always brought closer to the primary coil and thus the electric power is efficiently carried from the primary coil to the induction coil, and resultantly the advantage is realized in that the battery can be quickly recharged.

Further, in the case of the mobile electronic equipment and the battery charger cradle described above, when the mobile electronic equipment is placed on the mounting portion of the battery charger cradle, the equipment is guided to a prescribed position by the curved bottom surface and the curved rear surface, for example, without having to guide a positioning protrusion to a positioning recess for a precise engagement like in a conventional method. When the mobile electronic equipment is placed on the mounting portion, the induction coil can be brought closer to the primary coil accordingly, which also realizes the advantage that many users can conveniently use the mobile electronic equipment and the battery charger cradle to efficiently recharge the battery of the mobile electronic equipment.

In the case of the mobile electronic equipment and the battery charger cradle of the present invention, the induction coil 51 can be a coil wound in a shape of curved surface matching with the curved rear surface 53.

In such structure, since the induction coil is wound in a shape of curved surface running along the curved rear surface, the induction coil can be disposed closer to the curved rear surface, namely, even closer to the primary coil incorporated inside the curved bottom surface. In view of this aspect, since the induction coil can be disposed closer to the primary coil and further the curved bottom surface and the curved rear surface of the unique structure as described above can be guided closer to each other to be positioned in place, the electric power being more efficiently carried from the primary coil to the induction coil enables the battery to be quickly recharged.

In the case of the mobile electronic equipment and the battery charger cradle of the present invention, the mobile electronic equipment 50 is covered with a detachable cover 40, and the mounting portion 12 of the battery charger cradle 10 has an internal profile allowing the mobile electronic equipment 50 covered with the cover 40 to be placed on the mounting portion.

In the mobile electronic equipment and the battery charger cradle of this structure, the mobile electronic equipment, whether or not being covered with the cover, can be guided to the prescribed place of the mounting portion, and so the induction coil brought closer to the primary coil enables the battery of the mobile electronic equipment to be efficiently recharged.

In the case of the mobile electronic equipment and the battery charger cradle of the present invention, the mounting portion 12 of the battery charger cradle 10 is postured to be inclined upwardly toward a rear side in a longitudinal direction of the curved bottom surface 13 being U-grooved and has a stopper wall 14 provided at a bottom end of the mounting portion 12. The battery charger cradle 10 is so designed that a bottom end of the mobile electronic equipment 50 is placed and mounted on the stopper wall 14 in a posture of being inclined upwardly toward a rear side in a longitudinal direction of the mobile electronic equipment 50 which is to be placed on the mounting portion 12.

In the mobile electronic equipment and the battery charger cradle of this structure, displacement of the mobile electronic equipment can be inhibited in its longitudinal direction when the bottom end of the mobile electronic equipment is placed and mounted on the stopper wall of the mounting portion, and displacement in a lateral direction intersecting the longitudinal direction can also be inhibited by guiding the curved rear surface of the mobile electronic equipment to the curved bottom surface of the mounting portion. In view of this aspect, the battery can be efficiently recharged by inhibiting the longitudinal and lateral displacement of the mobile electronic equipment which is placed on the mounting portion and by always bringing the induction coil closer to the primary coil.

In the case of the mobile electronic equipment and the battery charger cradle of the present invention, the mobile electronic equipment 50 incorporates the induction coil 51 wound in a state of a curved surface matching with the curved rear surface 53, and the induction coil 51 is in a loop elongated in a longitudinal direction of the curved bottom surface 13 being curved in the U-grooved shape.

Such structure enables the battery to be efficiently recharged by enlarging an area where the induction coil and the primary coil are electromagnetically coupled to each other.

The mobile electronic equipment and the battery charger cradle of the present invention are so constructed and arranged that the mobile electronic equipment 50 includes:

an electronic device 60 having a battery storage 61 for accommodating a plurality of cylindrical batteries 54 in a mutually parallel relationship at a rear surface; and a battery pack 70 detachably accommodated in the battery storage 61 of the electronic device 60, and the battery pack 70 incorporates the induction coil 51 and the batteries 54.

Such structure enables the batteries incorporated in the battery pack to be recharged when the battery pack is accommodated instead of the cylindrical battery to be placed into the battery storage and when the mobile electronic equipment is placed on the battery charger cradle in a state of accommodating the batteries of the battery pack.

The mobile electronic equipment and the battery charger cradle of the present invention has a connection portion 17 for enabling the battery charger cradle 10 to be detachably connected to another adjacent battery charger cradle 10.

In this structure, a plurality of battery charger cradles can be interconnected to recharge batteries contained in a plurality of mobile electronic equipment.

The above and further objects of the present invention as well as the features thereof will become more apparent from the following detailed description to be made in conjunction with the accompanying drawings.

DETAILED DESCRIPTION OF THE EMBODIMENT(S)

Figure 1:
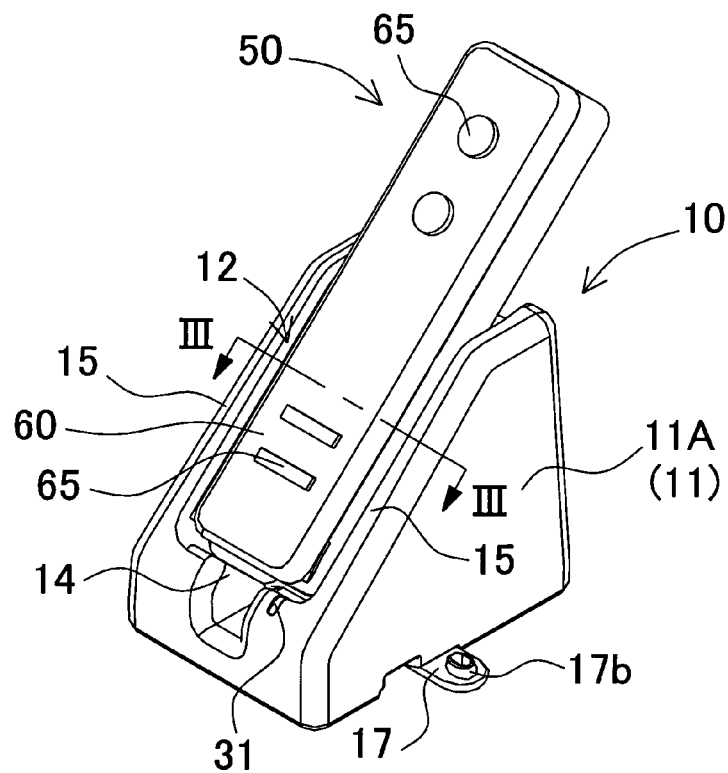
FIG. 1 is a perspective view of the mobile electronic equipment and the battery charger cradle in accordance with an embodiment of the present invention, and shows that the mobile electronic equipment without being covered with a cover is placed on the battery charger cradle.
Figure 2:
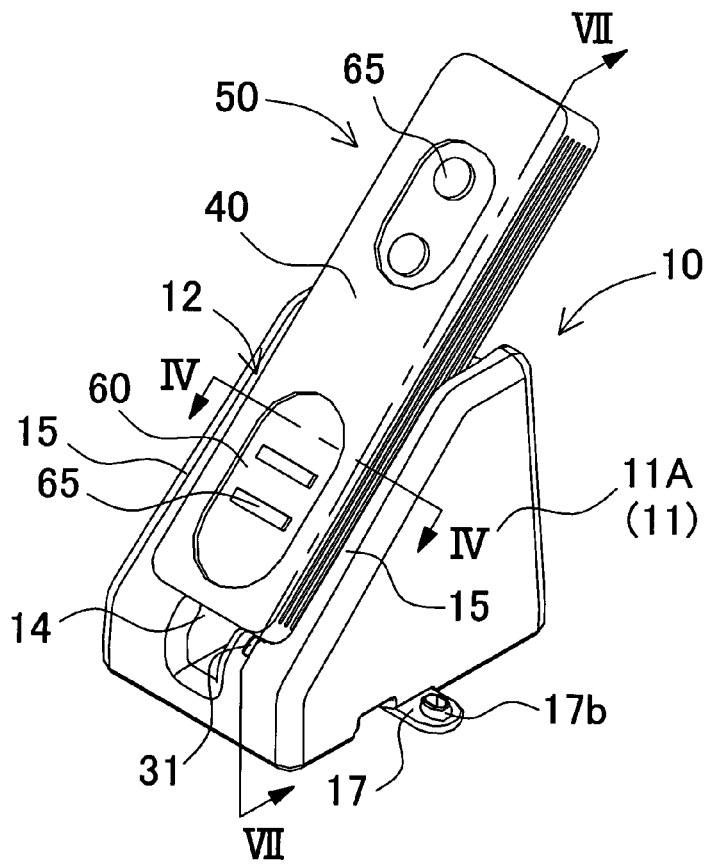
FIG. 2 is a perspective view of the mobile electronic equipment and the battery charger cradle in accordance with an embodiment of the present invention, and shows the mobile electronic equipment being covered with a cover is placed on the battery charger cradle.
Figure 3:
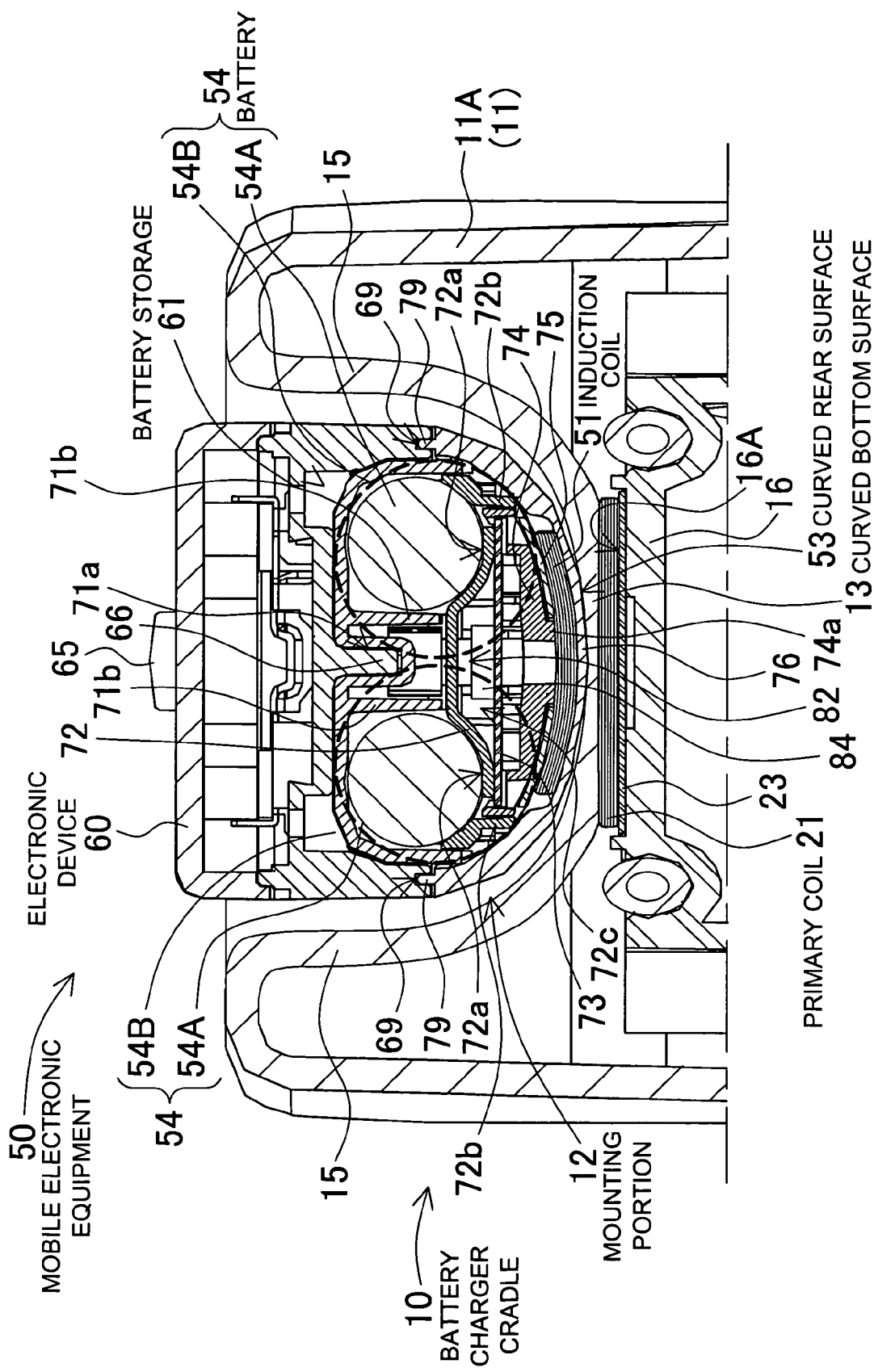
FIG. 3 is a sectional view taken along line III-III of the mobile electronic equipment and the battery charger cradle shown in FIG. 1.
Figure 4:
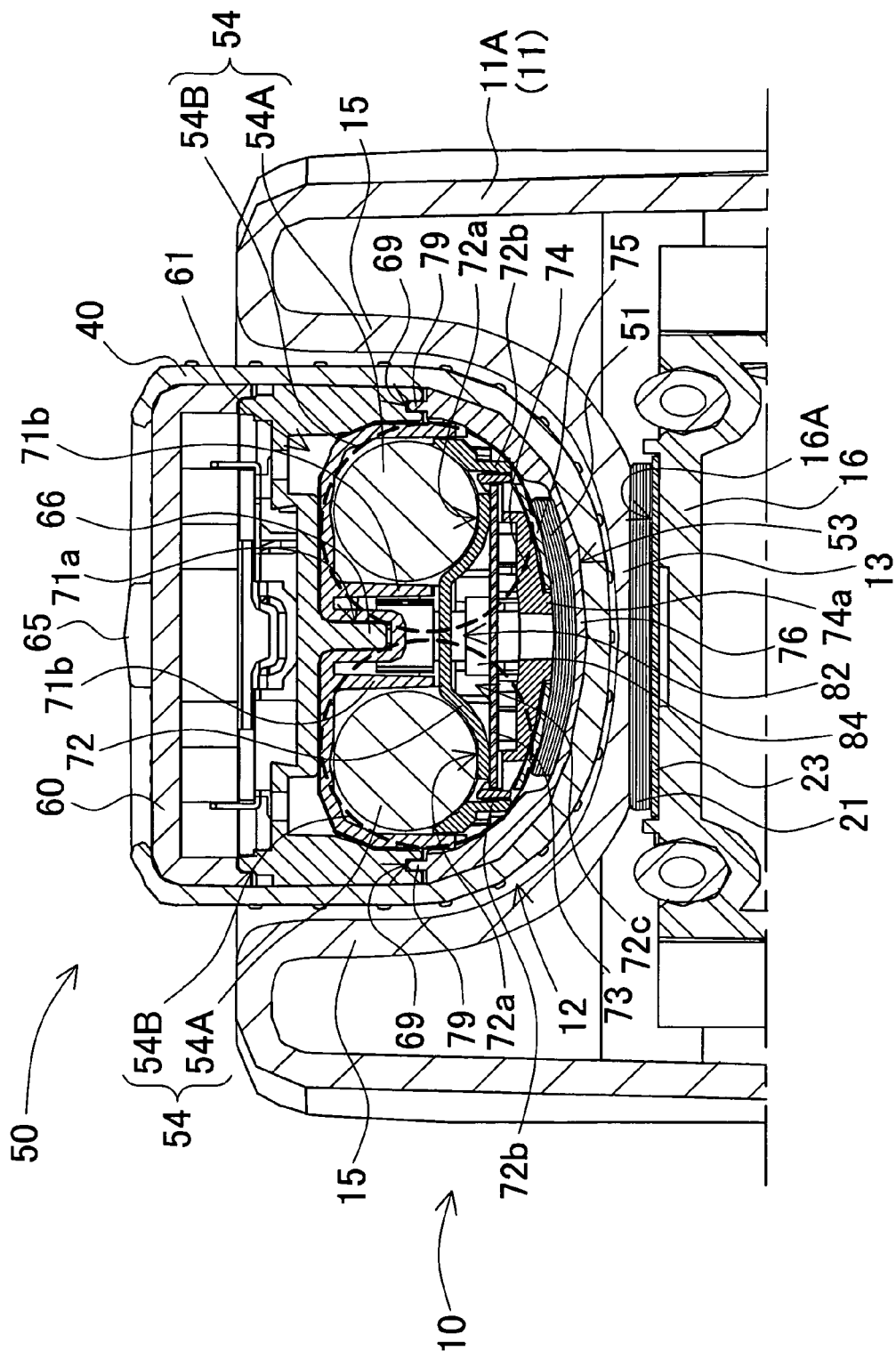
FIG. 4 is a sectional view taken along line IV-IV of the mobile electronic equipment and the battery charger cradle shown in FIG. 2.

FIG. 1 through FIG. 4 show a state where mobile electronic equipment 50 is placed on a mounting portion 12 of a battery charger cradle 10. FIG. 1 and FIG. 3 show a state where the mobile electronic equipment 50 without a cover is placed on the battery charger cradle 10, while FIG. 2 and FIG. 4 show a state where the mobile electronic equipment 50 being covered with a cover 40 is placed on the battery charger cradle 10. As shown in FIG. 3 and FIG. 4, the mobile electronic equipment 50 incorporates an induction coil 51 and a battery 54, the battery 54 being charged by electric power being electrically carried to the induction coil 51. The battery charger cradle 10 is so designed as to detachably place the mobile electronic equipment 50 on the mounting portion 12 of a casing 11 and recharge the battery 54 contained in the mobile electronic equipment 50. A useful example of the mobile electronic equipment 50 in the present embodiment is a remote controller for operating an electronic product such as an electronic gaming machine.

Figure 5:
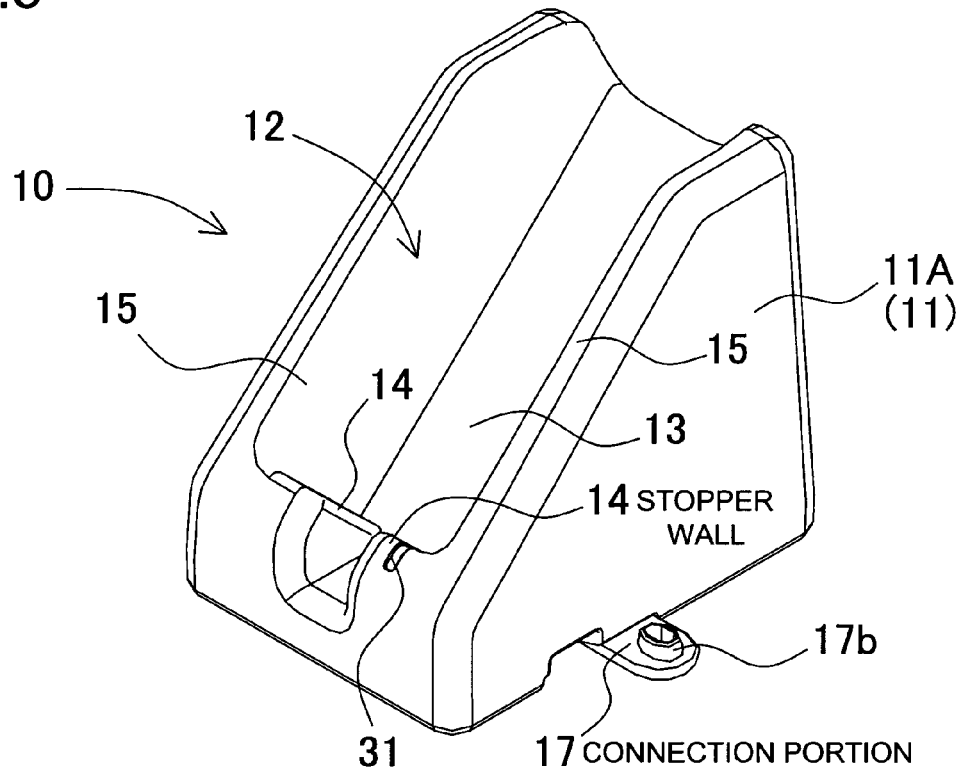
FIG. 5 is a perspective view of the battery charger cradle.

The battery charger cradle 10 shown in FIG. 3 through FIG. 5 has the mounting portion 12 defined at an upper casing 11A. The bottom surface of the mounting portion 12 at the upper casing 11A is a curved bottom surface 13 being curved in a U-grooved shape. In the mounting portion 12 at the upper casing 11A in the drawing, the longitudinal direction of the curved bottom surface 13 being U-grooved is postured to be inclined upwardly toward the rear direction, and a stopper wall 14 is provided at the bottom end. The mounting portion 12 is U-grooved in the cross section orthogonal to the longitudinal direction and serves to guide the mobile electronic equipment 50 to a precise position. The upper casing 11A has a pair of side walls 15 provided on either side of the mounting portion 12, and is fabricated of a plastic material formed in a shape of having the stopper wall 14 at the bottom end of the mounting portion 12.

Figure 6:
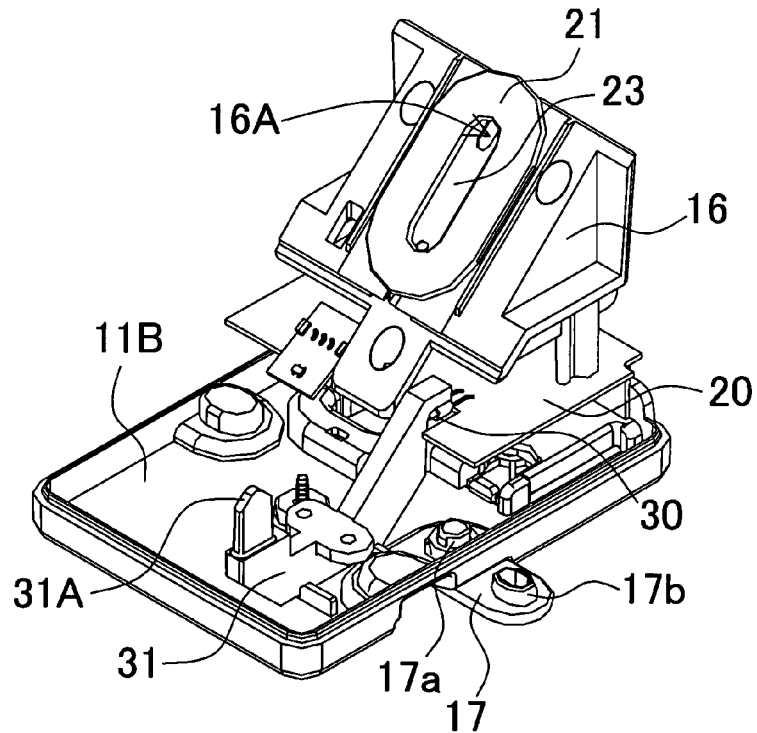
FIG. 6 is a perspective view of the battery charger cradle, shown in FIG. 5, with its upper casing being removed.
Figure 7:
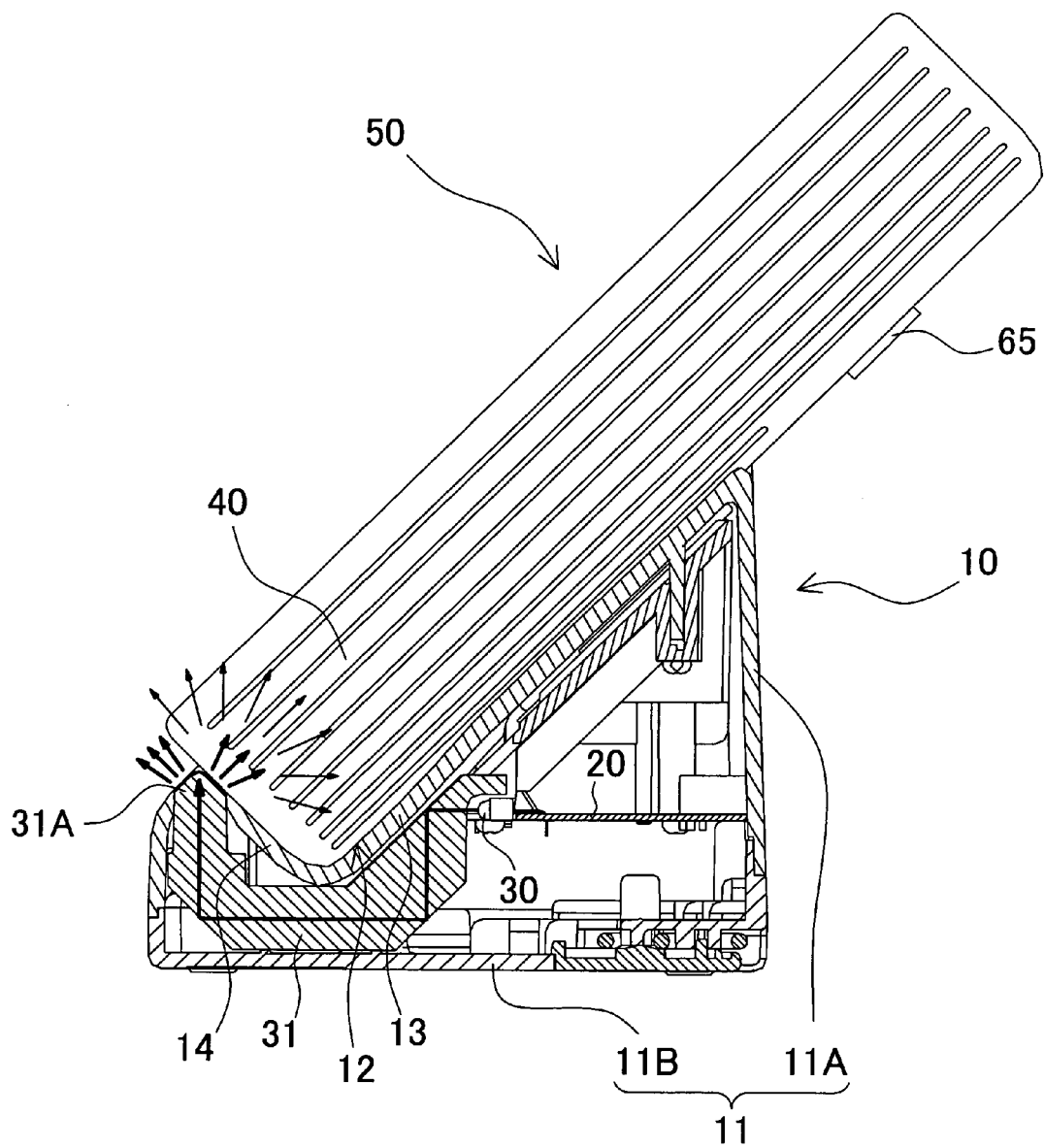
FIG. 7 is a sectional view taken along line VII-VII of the mobile electronic equipment and the battery charger cradle shown in FIG. 2.

To further describe the illustrated upper casing 11A, a light guide 31 is exposed on the stopper wall 14 for irradiating a light of an LED 30 to the outside. The light guide 31 is made of a translucent plastic material and is fixed to a lower casing 11B as shown in FIG. 6 and FIG. 7. The light guide 31 guides the light of the LED 30, disposed on a circuit board 20 fixed in the casing 11, to an exposure portion 31A at its tip, and the light is irradiated from the exposure portion 31A to the outside. The tip of the exposure portion 31A is exposed on an outer surface side of the stopper wall 14 and on an inner surface side of the stopper wall 14 (namely, toward the mounting portion 12), and the light emitted from the LED 30 is irradiated to the outer surface of the stopper wall 14 and to the inner surface of the stopper wall 14. The light emitted to the inner surface of the stopper wall 14 is irradiated onto the cover 40 of the mobile electronic equipment 50 to allow for a light emission at the cover 40 as shown in FIG. 7.

As shown in FIG. 3, FIG. 4 and FIG. 6, the battery charger cradle 10 has a primary coil 21 disposed inside the curved bottom surface 13 of the upper casing 11A. The primary coil 21 is a flat coil wound in a planar state and is disposed closer to the inner surface of the curved bottom surface 13. The primary coil 21 is wound in a loop elongated in the longitudinal direction of the U-shaped groove so as to enable the electric power to be carried to an area elongated along the longitudinal direction. The illustrated primary coil 21 is a coil in a planar state, but the primary coil can also be a flat coil where the opposite sides are of a curved surface matching with the curved bottom surface.

The primary coil 21 has a shield layer 23 provided at a side opposite to the induction coil 51, that is, subjacent to the primary coil 21 as viewed in the drawing. The shield layer 23 is a layer composed of metal or ferrite having high magnetic permeability and the layer shields the side of the primary coil 21 opposite to the induction coil 51. The shield layer 23 and the primary coil 21 are fixed to a plastic-made support platform 16 incorporated in the casing 11. The support platform 16 is fixed to the lower casing 11B so as to interpose the circuit board 20, and the shield layer 23 and the primary coil 21 are disposed in place at the casing 11. The support platform 16 has a slanted surface 16A matching with the curved bottom surface 13, and the shield layer 23 and the primary coil 21 are fixed to the slanted surface 16A in a layered state.

Figure 8:
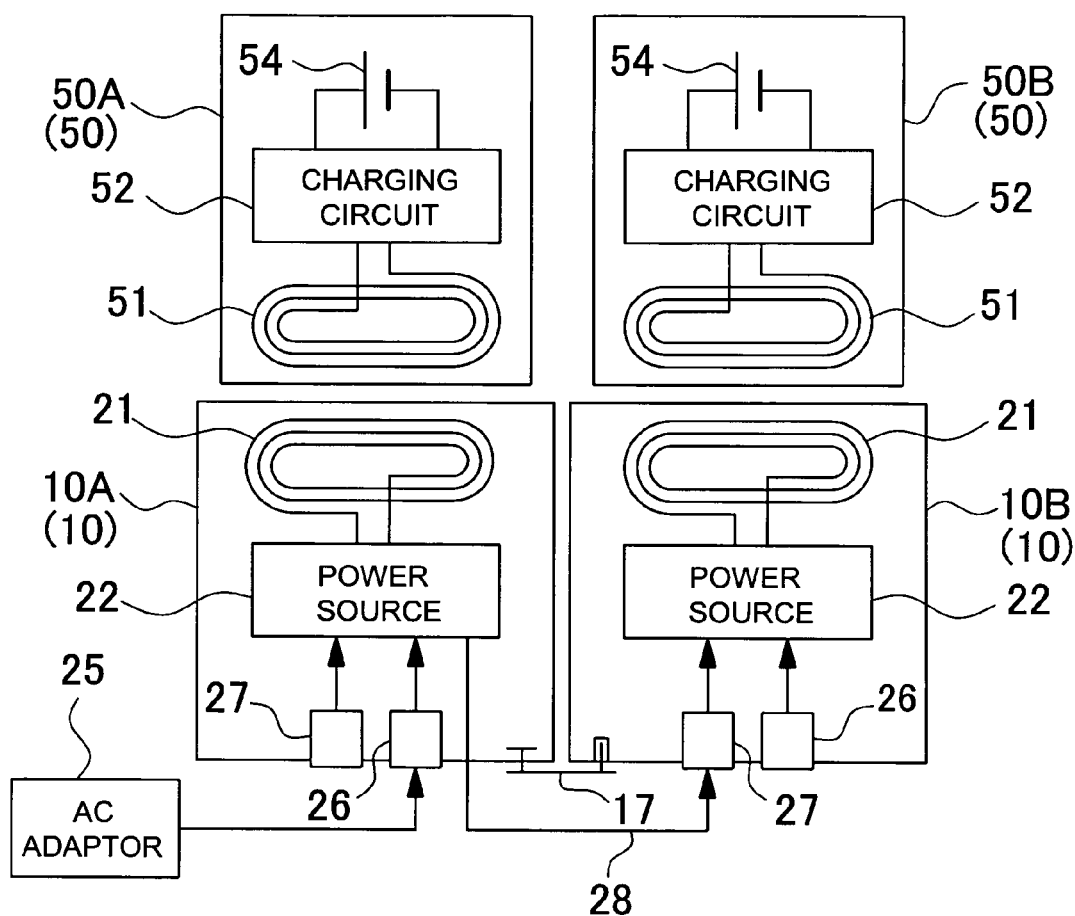
FIG. 8 is a circuit diagram of the mobile electronic equipment and the battery charger cradle in accordance with an embodiment of the present invention, and shows a state where a plurality of battery charger cradles are configured in use.

As shown in the circuit diagram in FIG. 8, the primary coil 21 is connected to a high-frequency power source 22 mounted on the circuit board 20. The high-frequency power source 22 converts DC power, fed from an AC adaptor 25, to high-frequency electric power, which is then supplied to the primary coil 21. The high-frequency power source 22 incorporates a circuit for interrupting an output of the high-frequency electric power when a battery 54 incorporated in the mobile electronic equipment 50 has been fully charged. A fully charged state of the battery 54 contained in the mobile electronic equipment 50 is detected by means of a charging circuit 52 incorporated in the mobile electronic equipment 50. The high-frequency power source 22, communicating with the charging circuit 52 in the mobile electronic equipment 50, can interrupt the output of the high-frequency electric power by detecting that the battery 54 of the mobile electronic equipment 50 has been fully charged.

Figure 9:
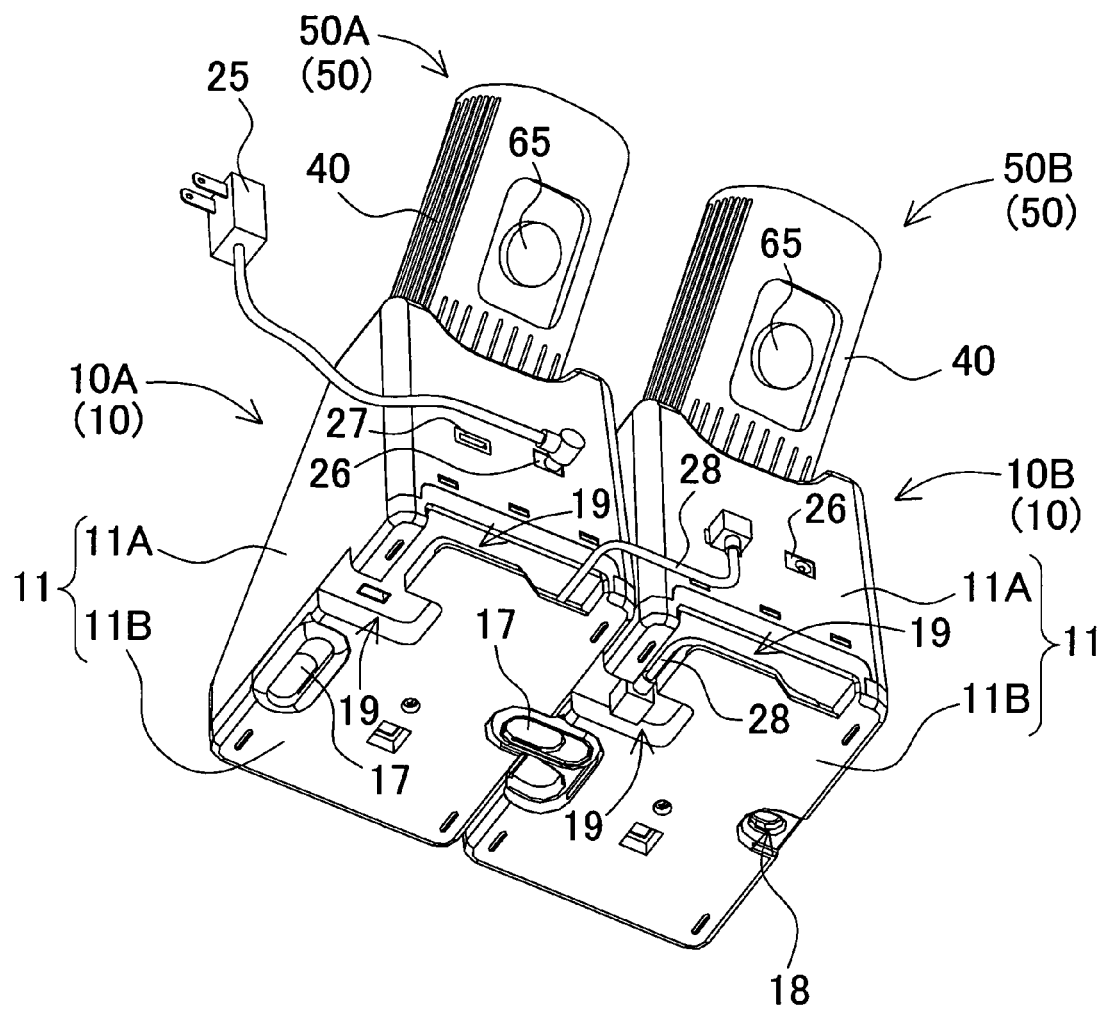
FIG. 9 is a rear perspective view showing a state where a plurality of battery charger cradles are configured in use, as viewed from the bottom surface.

FIG. 9 shows a state where a plurality of battery charger cradles 10 are placed side by side to recharge the battery contained respectively in a plurality of mobile electronic equipment 50. The battery charger cradle 10 used in such state has a connection portion 17 at a lateral side, the connection portion 17 allowing the adjacent battery charger cradles 10 to be detachably interconnected. The connection portion 17 is connected to the bottom surface of the lower casing 11B such that the connection portion 17 can be retracted inside by pivotal motion of 90 degrees in a horizontal plane. The connection portion 17 is made of a plastic material and, as can be seen in FIG. 6, the connection portion 17 has at its first end a pivotal shaft 17a projecting upwardly to be connected pivotably to the lower casing 11B, while the connection portion 17 has at its second end a fitting-on protrusion 17b projecting upwardly to be guided into a fitting-in recess 18 defined at the lower casing 11B of the adjacent battery charger cradle 10. The lower casing 11B has at its bottom the fitting-in recess 18 to guide the fitting-on protrusion 17b of the connection portion 17 into the fitting-in recess 18. The connection portion 17, when not in use, is retracted inside so as not to project toward the adjacent battery charger cradle 10. When the battery charger cradles 10 are used side by side, the connection portion 17 is pivoted at 90 degrees; is drawn out of the lower casing 11B; allows the fitting-on protrusion 17b into the fitting-in recess 18 at the adjacent lower casing 11B; and interconnects the adjacent battery charger cradles 10.

FIG. 8 shows a circuit diagram of the high-frequency power source 22 incorporated in the battery charger cradle 10.

The power source 22 receives a supply of electric power from a power source connector 26 which is inputted by the AC adaptor 25 and from an exterior inputting connector 27 which is inputted by the adjacent battery charger cradle 10. As shown in FIG. 9, the power source connector 26 and the exterior inputting connector 27 are fixed to the rear surface of the casing 11. Further, detachably accommodated in the bottom surface of the casing 11 is a power source cord 28 for supplying the electric power to the adjacent battery charger cradle 10. In order to accommodate the power source cord 28, a storage recess 19 is defined at the bottom surface of the casing 11 so as to allow the power source cord 28 to be fitted in the storage recess 19. The power source cord 28 is connected to the high-frequency power source 22.

In order to recharge the battery 54 contained in the mobile electronic equipment 50, the high-frequency power source 22 switches the electric power inputted from the power source connector 26 and the electric power inputted from the exterior inputting connector 27. That is to say, the primary coil 21 is thus excited. As shown in FIG. 8 and FIG. 9, in interconnecting a first battery charger cradle 10A and a second battery charger cradle 10B to recharge the battery 54 in first mobile electronic equipment 50A and the battery 54 in second mobile electronic equipment 50B, the following steps are carried out to recharge the batteries 54 contained in the two units of mobile electronic equipment 50.

(1) The first battery charger cradle 10A is connected to the AC adaptor 25 to supply DC power from the AC adaptor 25 to the power source 22 of the first battery charger cradle 10A. The power source 22 of the first battery charger cradle 10A excites the primary coil 21 by means of the DC power inputted from the AC adaptor 25 and recharges the battery 54 contained in the first mobile electronic equipment 50A. In this state, the power source 22 of the first battery charger cradle 10A does not output electric power through the power source cord 28.

(2) When the battery 54 contained in the first mobile electronic equipment 50A has been fully charged, the power source 22 of the first battery charger cradle 10A stops exciting the primary coil 21, and the DC power is outputted through the power source cord 28 to the second battery charger cradle 10B.

(3) The power source 22 of the second battery charger cradle 10B excites the primary coil 21 by means of the DC power inputted through the power source cord 28 (namely, by means of the DC power inputted from the exterior inputting connector 27) and recharges the battery 54 contained in the second mobile electronic equipment 50B. When the battery 54 contained in the second mobile electronic equipment 50B has been fully charged, the power source 22 of the second battery charger cradle 10B stops exciting the primary coil 21, and then the recharging operation of the battery 54 is completed.

As described above, the circuit configuration for sequentially recharging the batteries 54 contained in a plurality of mobile electronic equipment 50 can fully charge the batteries 54 contained in the plurality of mobile electronic equipment 50, without increase in the electric power which is inputted from the AC adaptor 25.

Figure 10:
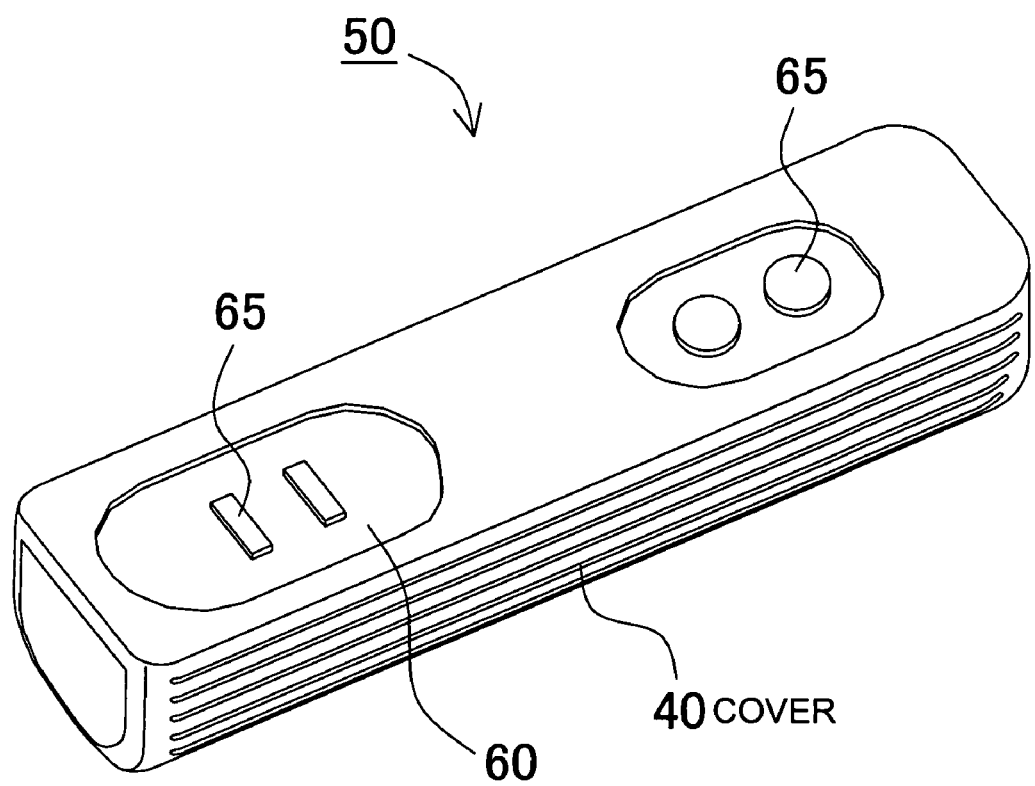
FIG. 10 is a perspective view of the mobile electronic equipment being covered with a cover.

As shown in FIG. 3 and FIG. 4, the mobile electronic equipment 50 is so designed that, to be placed on the mounting portion 12 of the battery charger cradle 10, the rear surface is the curved rear surface 53 which is curved in a shape of matching with the curved bottom surface 13 being U-grooved and that the induction coil 51 wound on a curved surface matching with the curved rear surface 53 is incorporated inside the curved rear surface 53. FIG. 10 is a perspective view showing the mobile electronic equipment 50 covered with the detachable cover 40. A portion exposed in the cover 40 is an operation portion 65 such as a switch provided on the casing surface of the electronic device 60 of the mobile electronic equipment 50, and a surface devoid of the operation portion 65 is covered. Since the illustrated mobile electronic equipment 50 is provided with the operation portion 65 such as a switch partially on the frontal and rear surfaces, the mobile electronic equipment 50 is covered: in a generally overall surface except for the upper switch portion on the rear surface of the mobile electronic equipment 50 devoid of the operation portion 65; in a circumferential surface composed of lateral sides and top and bottom sides; and in the periphery of the frontal surface. The cover 40 is adapted to cover the mobile electronic equipment 50 in close contact with its surface by way of elastic contraction. The cover 40 is also adapted to cover the mobile electronic equipment 50 in a detachable manner by way of contraction and expansion. The mobile electronic equipment 50, in a state of being or not being covered with the cover 40, is placed on the mounting portion 12 of the battery charger cradle 10 to recharge the incorporated battery 54. The cover 40 is made of a stretchable soft plastic material, natural rubber or synthetic rubber to protect the mobile electronic equipment 50 from a shock of drop or collision. As shown in FIG. 1 and FIG. 2, the mobile electronic equipment 50 covered or not covered with the cover 40 is placed on the mounting portion 12 of the battery charger cradle 10, with the vertical longitudinal direction being postured to be inclined upwardly toward the rear side, in a posture with the equipment's bottom end being engaged on the stopper wall 14.

Figure 11:
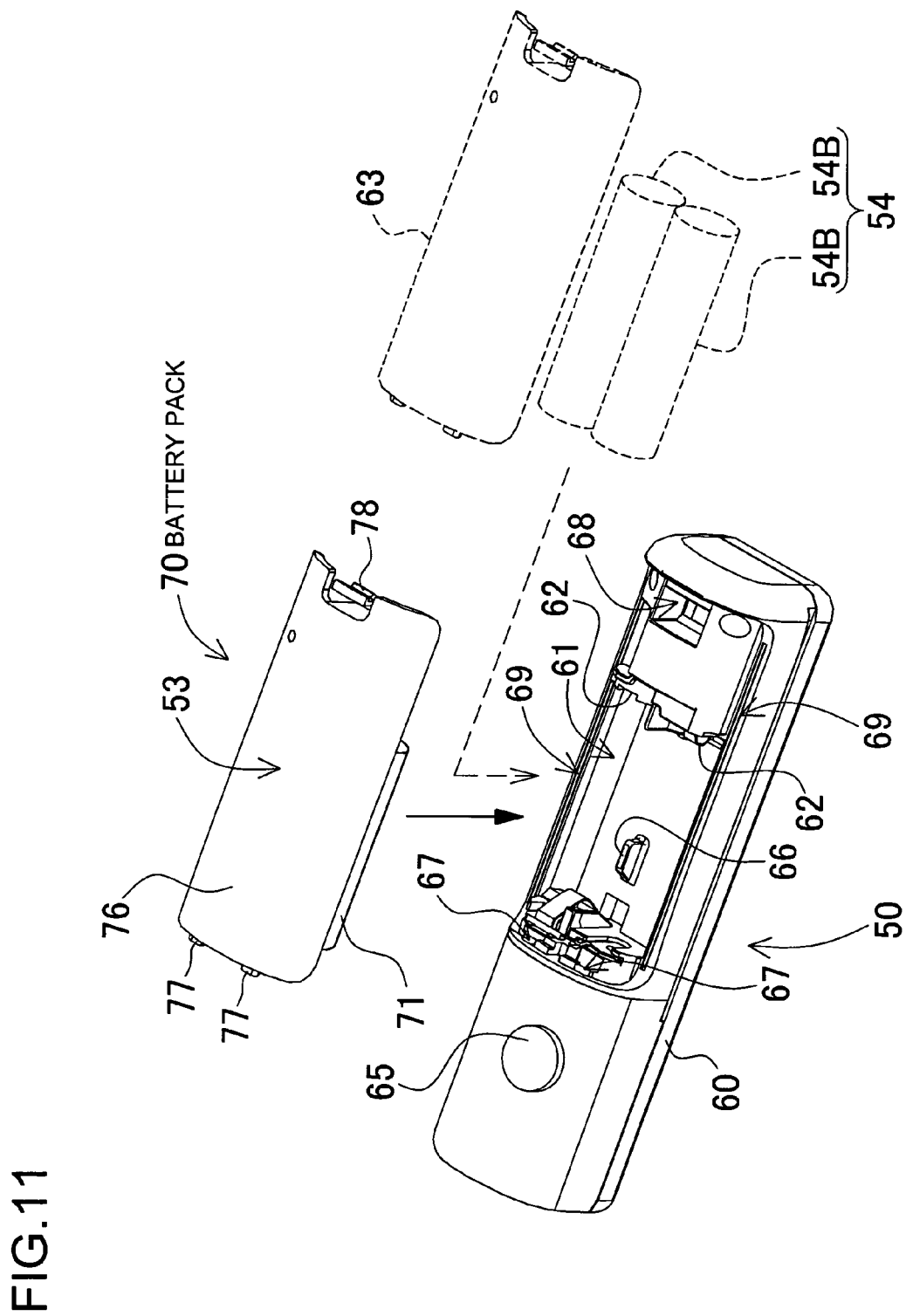
FIG. 11 is an exploded perspective view showing a state where the battery pack is removed off the mobile electronic equipment.

The mobile electronic equipment 50 incorporates, inside its curved rear surface 53, the induction coil 51 wound on the curved surface matching with the curved rear surface 53. The mobile electronic equipment 50 shown in FIG. 3, FIG. 4 and FIG. 11 includes: an electronic device 60 having the battery storage 61 for accommodating a plurality of cylindrical batteries 54 in a mutually parallel relationship; and a battery pack 70 detachably placed in the battery storage 61 of the electronic device 60. The electronic device 60 has the battery storage 61 with its rear surface being opened, the battery pack 70 is placed in the battery storage 61, and the opening is closed. The illustrated mobile electronic equipment 50 incorporates the battery 54 and the induction coil 51 in the battery pack 70, and the induction coil 51 is accommodated inside the curved rear surface 53. As indicated by dashed line in FIG. 3, FIG. 4 and FIG. 11, the battery storage 61 of the electronic device 60 is shaped such that a plurality of size AA batteries 54B (two pieces of batteries in the drawing) can be received in a mutually parallel relationship. Instead of the plurality of size AA batteries 54B (two pieces of batteries in the drawing), the battery pack 70 is so profiled as to be detachably receivable in the battery storage 61. As shown in FIG. 11, either of the size AA batteries 54B or the battery pack 70 can be conveniently used with the mobile electronic equipment 50 thus structured. As a matter of course, the mobile electronic equipment can incorporate a rechargeable battery in a non-detachable manner instead of a detachable battery pack, and can also dispose, inside the curved rear surface, the induction coil for switching the charging electric power for the battery. As indicated by dashed line in FIG. 11, the electronic device 60 closes the opening by means of a removable lid 63 in a state that the size AA batteries 54B are loaded in the battery storage 61. The removable lid 63 is removably connected to the opening of the battery storage 61. In a state that the removable lid 63 is removed and the size AA batteries 54B are loaded in the battery storage 61, the removable lid 63 is connected to the electronic device 63 and the opening of the battery storage 61 is closed.

Figure 12:
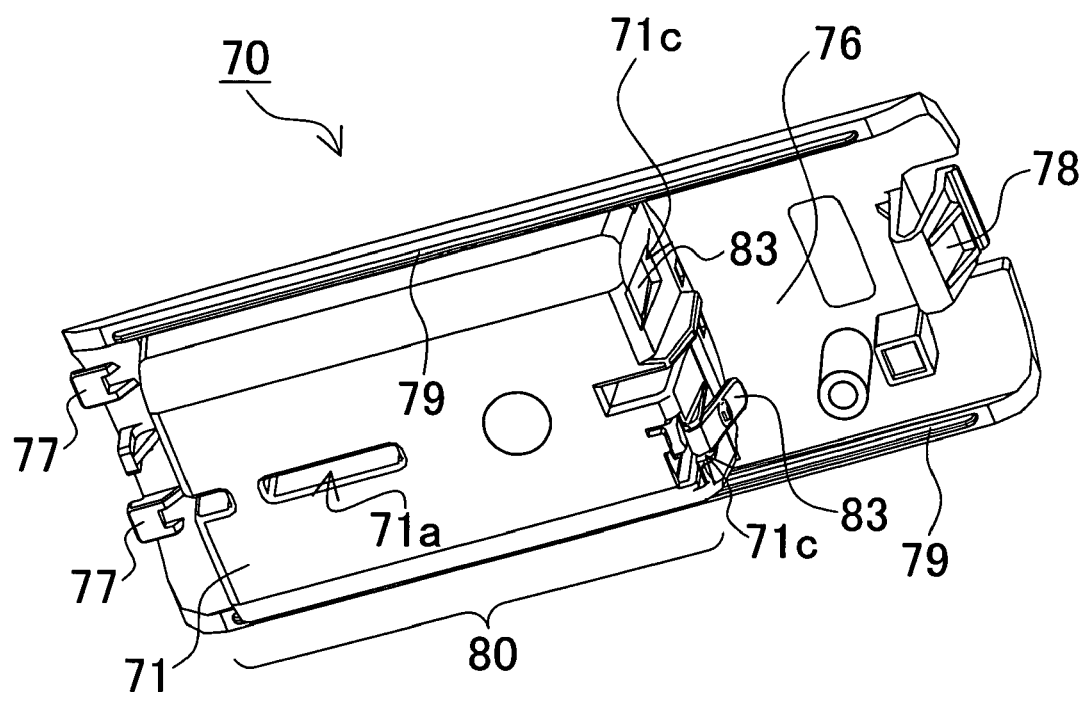
FIG. 12 is a bottom perspective view of the battery pack shown in FIG. 11.
Figure 13:
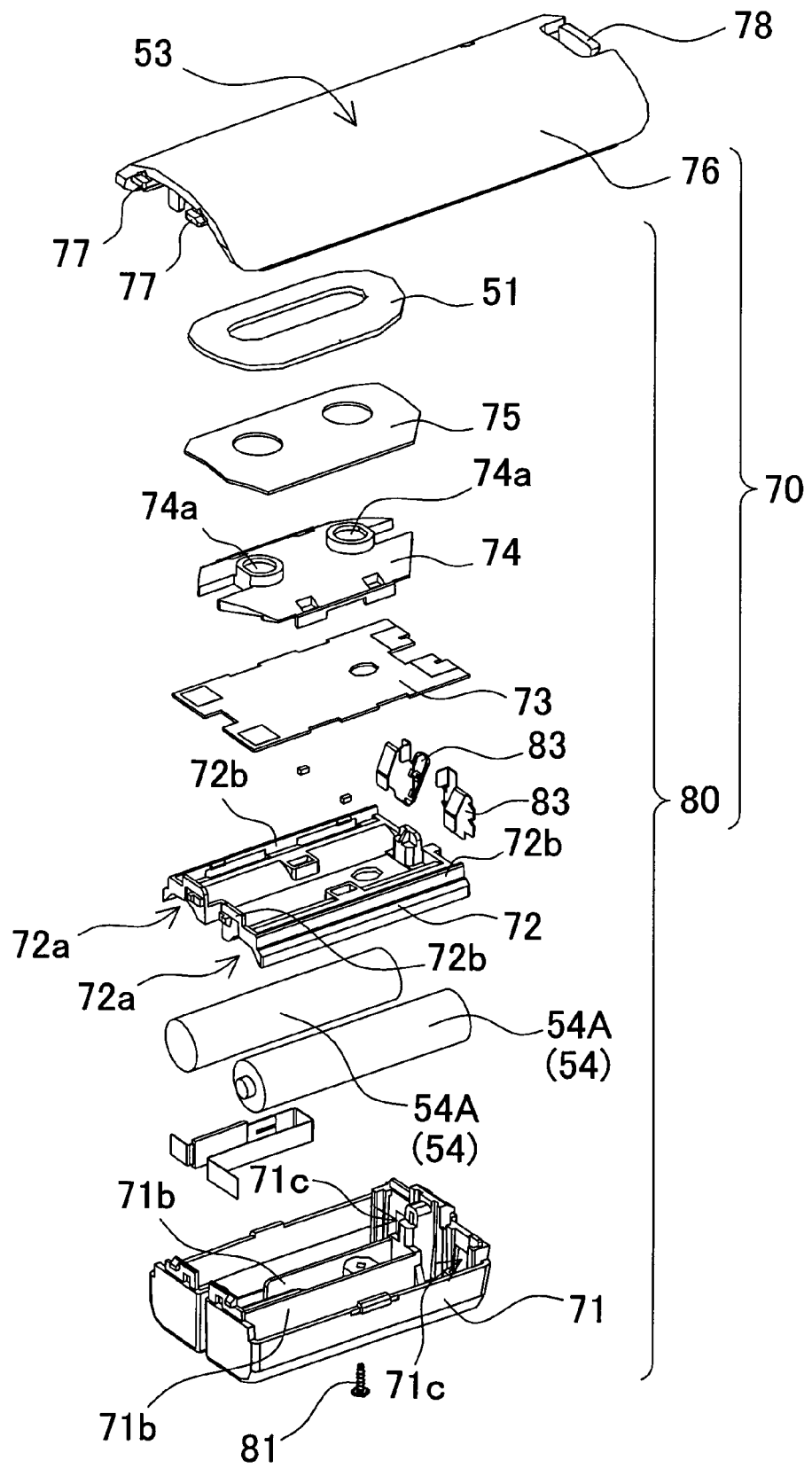
FIG. 13 is an exploded perspective view of the battery pack shown in FIG. 12.

When the removable lid 63 is removed, the battery pack 70 is placed in the battery storage 61. The battery pack 70 placed in the battery storage 61 is provided integrally with the removable lid. When the battery pack 70 is placed in the battery storage 61, the opening is closed. The battery pack 70 is shown in FIG. 12 and FIG. 13. FIG. 13 is an exploded perspective view of the battery pack 70 shown in FIG. 12. Further, FIG. 3 and FIG. 4 are sectional views showing a state that the mobile electrical equipment 50 is placed on the battery charger cradle 10. The battery pack 70 shown in these drawings includes: a battery casing 71 accommodating the battery 54; two pieces of size AAA batteries 54A accommodated in a battery casing 71; a battery holder 72 for positioning the size AAA batteries 54A in place; a circuit board 73 disposed in a state of being stacked with the battery holder 72 to be connected to the battery 54; a bracket 74 disposed in a state of being layered on the circuit board 73; a shield layer 75 disposed on the bracket 74; an induction coil 51 disposed on the shield layer 75; and a rear surface cover 76 disposed on the induction coil 51. The rear surface cover 76, the bracket 74 and the battery holder 72 are fabricated by forming an electrically insulating plastic material.

The rear surface cover 76 is formed in a curved surface matching with the curved rear surface 53 of the electronic device 60, with its outer and inner surfaces being of a curved surface. Since the illustrated rear surface cover 76 is used instead of the removable lid 63 of the battery storage 61, the cover is so profiled that the opening of the battery storage 61 can be closed, that is to say, the cover is formed in the same shape as the removable lid 63. The illustrated battery pack 70 is connected via the rear surface cover 76 to the battery storage 61 of the electronic device 60. The rear surface cover 76 has an engagement hook 77 integrally formed at the top end (at the lower left portion as viewed in FIG. 12) so as to be attachable to and detachable from the opening of the battery storage 61, and the rear surface cover 76 has an elastic hook 78 integrally formed at the bottom end (at the upper right portion as viewed in FIG. 12), the elastic hook 78 being engaged to the opening of the battery storage 61. The battery storage 61 has an engagement recess 67, 68 to be respectively engaged with the engagement hook 77 and the elastic hook 78 respectively at the upper and lower ends of the battery storage 61. The battery pack 70 is so designed that the engagement hook 77 is pushed onto the battery storage 61 in a manner of being hooked to the engagement recess 67, while the elastic hook 78 is engaged to the engagement recess 68 to be set with the battery storage 61 in a manner of not being disengaged. When the elastic hook 78 is elastically deformed to be removed off the engagement recess 68, the battery pack 70 can be removed off the electronic device 60. Further, the rear surface cover 76 shown in the sectional view in FIG. 3 and FIG. 4 has, at the center portion of opposite edges, a ridge 79 extending in the longitudinal direction. The ridge 79 is placed in a guide groove 69 provided at either side of the opening of the battery storage 61 provided at the electronic device 60, and the rear surface cover 76 is securely connected to the opening.

The induction coil 51 is disposed on the inner surface of the rear surface cover 76. The induction coil 51 is a flat coil winding a copper wire in a flat state, the copper wire being a metal that is coated on its surface with an insulating film. The coil is deformed into a shape matching with the curved surface of the inner surface of the rear surface cover 76 and is disposed adjacent to the curved surface of the rear surface cover 76. The induction coil 51 is of a loop elongated in the longitudinal direction of the mobile electronic equipment 50 (namely, in the longitudinal direction of the size AAA battery 54A) such that the induction coil 51 can be electromagnetically coupled to the primary coil 21 in an efficient manner.

The shield layer 75 is layered on the lower surface of the induction coil 51 to magnetically shield the circuit board 73 and the battery 54 from the primary coil 21. The shield layer 75 is a layer such as metal and ferrite with high magnetic permeability, serving to prevent the high frequency generated by the primary coil 21 from adversely affecting the circuit board 73, the battery 54, etc. The shield layer 75 is curved in a shape of matching with the induction coil 51 and is disposed adjacent to the rear surface of the induction coil 51.

The bracket 74 is made of a plastic material, and its surface facing the rear surface cover 76 is formed in a curved surface matching with the rear surface cover 76. The bracket 74 defines a curved gap between its surface and the inner surface of the rear surface cover 76, and the induction coil 51 and the shield layer 75 are fixed inside the gap in an interposed state. The bracket 74 is formed with its rear surface being planar, the rear surface facing the circuit board 73, or is formed in a shape of defining a recess for guiding an electronic component mounted on the circuit board 73, and the bracket 74 is fixed to the circuit board 73 in a layered state. The bracket 74 is further provided with a positioning protrusion 74a for positioning the induction coil 51 in place, the positioning protrusion 74a being integrally formed on the surface of the bracket 74. The positioning protrusion 74a is guided into the inner hole of the elongated induction coil 51 to position the induction coil 51 in place. As can be seen in FIG. 13 illustrating the bracket 74, two pieces of positioning protrusions 74a are spaced apart from each other in the longitudinal direction of the inner hole in the elongated induction coil 51 so as to be positioned at opposite ends of the hole, and thus the induction coil 51 is positioned in place. Further in the bracket 74, the portions where the positioning protrusions 74a exist are formed to be thicker so as to be concomitantly used as a screw-fitting boss for fixing the battery casing 71. To further describe the bracket 74, the battery casing 71 can be fixed to the bracket 74 when a set screw 81 extending through the battery casing 71 is screw-threaded into each of the positioning protrusions 74a of the bracket 74.

Mounted on the circuit board 73 is an electronic component 84 that realizes a charging circuit (not shown) for recharging the battery 54 by means of the electric power induced to the induction coil 51. The charging circuit recharges the battery 54 by converting the high-frequency electric power, induced to the induction coil 51, to DC with which the battery 54 can be recharged. In the circuit board 73, the mounted electronic component 84 is fixed on the bottom surface shown in FIG. 13 (on a top surface shown in FIG. 3 and FIG. 4), namely, on the battery side.

The battery holder 72 disposes a plurality of size AAA batteries 54A (two pieces of batteries in the drawing) in place as well as disposing the circuit board 73 in place. The battery holder 72 is made of a plastic material and formed in a shape of defining a fitting-in recess 72a for the battery 54 on a surface facing the battery. Since the illustrated battery pack 70 incorporates two pieces of size AAA batteries 54A, the fitting-in recess 72a shaped to match with the cylinder of the size AAA batteries 54A is defined in two parallel rows. Instead of the size AA battery 54B indicated by dashed line in FIG. 3 and FIG. 4, the size AAA battery 54A in the battery pack 70 is loaded in the battery storage 61. Since the size AAA battery 54A is diametrically smaller than the size M battery 54B, as can be seen in FIG. 3 and FIG. 4, the axes of the size AAA batteries 54A are disposed in a lateral separation toward either side as compared with the size AA batteries 54B being loaded in the battery storage 61 so as to define a wider gap between the batteries, and a storage space 82 is defined in such gap for disposing the electronic component 84 mounted on the circuit board 73. That is to say, the size AAA batteries 54A are disposed toward the outer sides to the largest possible extent to define the wider storage space 82 between the batteries.

The battery holder 72 has a peripheral wall 72b integrally formed on a board-side surface facing the circuit board 73, the peripheral wall 72b fitting the circuit board 73 in place. The circuit board 73 is fitted inside the peripheral wall 72b to be fixed in place. Further, the battery holder 72 has a recess 72c defined on the board-side surface to guide the electronic component 84 fixed to the circuit board 73. The recess 72c is defined between the adjacent batteries 54, and the storage space 82 defined between the batteries 54 is effectively used for disposing the electronic component 84.

The battery casing 71 is of a plastic-made box being able to accommodate a plurality of size AAA batteries 54A (two pieces of batteries in the drawing) inside, with the opening of the box being connected to the rear surface cover 76. The box-shaped battery casing 71 is fabricated by connecting the opening edge to the rear surface cover 76 in a fitting-on engagement structure or by a welded connection, with the opening being closed by the rear surface cover 76. The battery casing 71 shown in the sectional view in FIG. 3 and FIG. 4 has, at its bottom surface, a guide groove 71a defined for guiding a separation wall 66 provided in the battery storage 61. The separation wall 66 is provided between the batteries 54 to accommodate the size AA batteries 54B in place. Further, the battery casing 71 has a retention rib 71b integrally formed at opposite sides of the guide groove 71a, the retention rib 71b being for disposing the size AAA batteries 54A in place. The battery casing 71 contains the size AAA batteries 54A between the retention rib 71b and the opposing side walls for the batteries to be disposed in place. Further, the battery casing 71 has a contact window 71c opened to expose an output terminal 83 to the outside, so that the output terminal 83 is exposed through the contact window 71c to the outside. The output terminal 83 of the battery pack 70 contacts a power source terminal 62 provided to the battery storage 61 and allows the electric power to be supplied to the electronic device 60. The power source terminal 62 is disposed in a position of contacting an electrode of the size AA battery 54B accommodated in the battery storage 61. Therefore, the battery pack 70 is accommodated instead of the size AA battery 54B, and the electric power is supplied from the battery pack 70 to the electronic device 60.

The above-described battery pack 70 is assembled in the following steps.

(1) The battery 54 is accommodated in the battery casing 71, and the battery holder 72 is disposed on the battery 54 to dispose the battery 54 in place.

(2) The circuit board 73 and the bracket 74 are stacked with the battery holder 72, and further the induction coil 51 is layered on the bracket 74 via the shield layer 75 to dispose the induction coil 51 in place on the bracket 74. In such state, the circuit board 73, the battery 54 and the induction coil 51 are interconnected, and the output terminal 83 connected to the circuit board 73 is disposed inside the contact window 71c of the battery casing 71.

(3) The set screw 81 extending through the battery casing 71 is screw-threaded into the positioning protrusion 74a at the bracket 74, and the bracket 74 is fixed to the battery casing 71 to thus make up a battery assembly 80.

(4) The opening edge of the battery casing 71 is fixed to the rear surface cover 76, and the battery assembly 80 is fixed to the rear surface cover 76.

In the mobile electronic equipment and the battery charger cradle provided with the above-described structure in accordance with an embodiment of the present invention, the mobile electronic equipment 50 is covered with the detachable cover 40, and the mounting portion 12 of the battery charger cradle 10 is internally profiled to enable the mobile electronic equipment 50 covered with the cover 40 to be placed on the mounting portion 12 of the battery charger cradle 10. The mobile electronic equipment and the battery charger cradle of this structure guide the mobile electronic equipment 50, whether or not being covered with the cover 40, to a prescribed position of the mounting portion 12, and the battery 54 contained in the mobile electronic equipment 50 can be efficiently recharged, with the induction coil 51 being brought closer to the primary coil 21.

As shown in FIG. 3, in a state that the mobile electronic equipment 50 without being covered with the cover is properly disposed, a bottommost portion of the curved bottom surface 13 of the battery charger cradle 10 coincides with and contacts a bottommost portion of the curved rear surface 53 of the mobile electronic equipment 50. The curved bottom surface 13 of the battery charger cradle 10 and the curved rear surface 53 of the mobile electronic equipment 50 are in a bilaterally symmetrical structure, so that when the mobile electronic equipment 50 is placed on the mounting portion 12 of the battery charger cradle 10, the mobile electronic equipment 50 can slide down by the effect of its self weight to be disposed in an appropriate position. And, when the curved bottom surface 13 of the battery charger cradle 10 and the curved rear surface 53 of the mobile electronic equipment 50 are made of a plastic material having a lower coefficient of friction, the mobile electronic equipment 50 can be disposed in an appropriate position in such a manner of sliding down more easily.

Further, as shown in FIG. 4, even in a state that the mobile electronic equipment 50 is covered with the cover 40, when the curved rear surface 53 of the mobile electronic equipment 50 is placed on the curved bottom surface 13 of the battery charger cradle 10, alignment can be made easily in the following manner to carry out an efficient recharging operation.

(1) Alignment can be made well when the bottommost portion of the curved bottom surface 13 of the battery charger cradle 10 and the bottommost portion of the curved rear surface 53 of the mobile electronic equipment 50 are disposed in a manner of matching with each other.

(2) Since the curved bottom surface 13 of the battery charger cradle 10 and the curved rear surface 53 of the mobile electronic equipment 50 are in a bilaterally symmetrical structure, alignment can be made well if longitudinal axes of the cradle and the equipment are disposed in a manner of matching with each other.

(3) Alignment can be made well when the frontal surface of the mobile electronic equipment 50 is disposed to be horizontal in a left-and-right direction.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. Mobile electronic equipment and a battery charger stand for recharging the mobile electronic equipment, the mobile electronic equipment comprising:
    an incorporated induction coil; and
    an incorporated battery rechargeable by electric power being induced to the induction coil,
    the battery charger stand recharging the battery contained in the mobile electronic equipment when the mobile electronic equipment is detachably placed on the battery charger stand,
    wherein the battery charger stand is so constructed and arranged that a bottom surface of a mounting portion is a curved bottom surface being curved in a U-grooved shape and that a primary coil electromagnetically coupled to the induction coil of the mobile electronic equipment is incorporated inside the curved bottom surface, with the primary coil being connected to an electric power source,
    wherein the mobile electronic equipment is so constructed and arranged that a rear surface thereof to be placed on the mounting portion of the battery charger stand is a curved rear surface being in a curved shape of matching with the curved bottom surface being U-grooved and that the induction coil is incorporated inside the curved rear surface, and
    wherein when the mobile electronic equipment is placed on the mounting portion, the electric power is carried from the primary coil to the induction coil being electromagnetically coupled with each other, and the battery contained in the mobile electronic equipment is recharged by the electric power being induced to the induction coil.

2. The mobile electronic equipment and the battery charger stand as recited in claim 1, wherein the mobile electronic equipment is a remote controller for operating an electronic device.

3. The mobile electronic equipment and the battery charger stand as recited in claim 1, wherein the induction coil is a coil wound on a curved surface matching with the curved rear surface.

4. The mobile electronic equipment and the battery charger stand as recited in claim 1, wherein the mobile electronic equipment is covered with a detachable cover, and the mounting portion of the battery charger stand is internally profiled to enable the mobile electronic equipment covered with the cover to be placed thereon.

5. The mobile electronic equipment and the battery charger stand as recited in claim 1, wherein the mounting portion of the battery charger stand is postured to be inclined upwardly toward a rear side in a longitudinal direction of the curved bottom surface being U-grooved and has a stopper wall provided at a bottom end of the mounting portion, and a bottom end of the mobile electronic equipment is placed and mounted on the stopper wall in a posture of being inclined upwardly toward a rear side in a longitudinal direction of the mobile electronic equipment which is to be placed on the mounting portion.

6. The mobile electronic equipment and the battery charger stand as recited in claim 1, wherein the mobile electronic equipment incorporates the induction coil wound in a state of a curved surface matching with the curved rear surface, and the induction coil is in a loop elongated in a longitudinal direction of the curved bottom surface being curved in the U-grooved shape.

7. The mobile electronic equipment and the battery charger stand as recited in claim 1, wherein the mobile electronic equipment comprises:
an electronic device having a battery storage for accommodating a plurality of cylindrical batteries in a mutually parallel relationship at a rear surface; and
a battery pack detachably accommodated in the battery storage of the electronic device, wherein the battery pack incorporates the induction coil and the batteries.

8. The mobile electronic equipment and the battery charger stand as recited in claim 1, wherein the battery charger stand has an upper casing defining the mounting portion, and the bottom surface of the mounting portion at the upper casing is a curved bottom surface being curved in a U-grooved shape.

9. The mobile electronic equipment and the battery charger stand as recited in claim 8, wherein the mounting portion at the upper casing is so constructed and arranged that the longitudinal direction of the curved bottom surface being U-grooved is postured to be inclined upwardly toward the rear direction, that a stopper wall is provided at the bottom end of the mounting portion, and that a light guide is exposed on the stopper wall to irradiate a light of an LED to the outside.

10. The mobile electronic equipment and the battery charger stand as recited in claim 9, wherein the light guide is made of a translucent plastic material and guides the light of the LED, disposed on a circuit board fixed in a casing, to an exposure portion at a tip thereof, and the light is irradiated from the exposure portion to the outside.

11. The mobile electronic equipment and the battery charger stand as recited in claim 10, wherein the tip of the exposure portion of the light guide is exposed on an outer surface side of the stopper wall and on an inner surface side of the stopper wall, and the light emitted from the LED is irradiated to the outer surface of the stopper wall and to the inner surface of the stopper wall.

12. The mobile electronic equipment and the battery charger stand as recited in claim 1, wherein the primary coil is a flat coil wound in a planar state and is wound in a loop elongated in the longitudinal direction of the U-shaped groove so as to enable the electric power to be carried to an area elongated along the longitudinal direction.

13. The mobile electronic equipment and the battery charger stand as recited in claim 1, wherein the primary coil has a shield layer provided at a side opposite to the induction coil.

14. The mobile electronic equipment and the battery charger stand as recited in claim 13, wherein the shield layer is a layer composed of metal or ferrite having high magnetic permeability and shields the side of the primary coil opposite to the induction coil.

15. The mobile electronic equipment and the battery charger stand as recited in claim 14, wherein the shield layer and the primary coil are fixed to a plastic-made support platform incorporated in the casing.

16. The mobile electronic equipment and the battery charger stand as recited in claim 15, wherein the support platform has a circuit board fixed to the casing, and the shield layer and the primary coil are disposed in place at the casing.

17. The mobile electronic equipment and the battery charger stand as recited in claim 16, wherein the support platform has a slanted surface matching with the curved bottom surface, and the shield layer and the primary coil are fixed to the slanted surface in a layered state.

18. The mobile electronic equipment and the battery charger stand as recited in claim 1, wherein the battery charger stand has a connection portion allowing the adjacent battery charger stand to be detachably interconnected.

19. The mobile electronic equipment and the battery charger stand as recited in claim 18, wherein the connection portion is connected to a bottom surface of a casing such that the connection portion is retractable inside by pivotal motion of 90 degrees in a horizontal plane.

20. The mobile electronic equipment and the battery charger stand as recited in claim 18, wherein the connection portion has a first end thereof connected pivotably to a casing, while the connection portion has at a second end thereof a fitting-on protrusion projecting upwardly to be guided into a fitting-in recess defined at a lower casing of the adjacent battery charger stand.

21. The mobile electronic equipment and the battery charger stand as recited in claim 20, wherein the casing has at its bottom the fitting-in recess to guide the fitting-on protrusion of the connection portion into the fitting-in recess, and the connection portion is refracted inside when not in use.

22. The mobile electronic equipment and the battery charger stand as recited in claim 1, wherein the battery charger stand comprises:
a power source connector to which the electric power is inputted by an AC adaptor; and
an exterior inputting connector to which the electric power is inputted by the adjacent battery charger stand, and in order to recharge the battery contained in the mobile electronic equipment, the power source switches the electric power inputted from the power source connector and the electric power inputted from the exterior inputting connector.

23. The mobile electronic equipment and the battery charger stand as recited in claim 18, wherein the battery charger stand has a power source cord for supplying the electric power to the adjacent battery charger stand.

24. The mobile electronic equipment and the battery charger stand as recited in claim 23, wherein the battery charger stand has a storage recess defined at the bottom surface of a casing so as to allow the power source cord to be fitted in the storage recess.

25. A battery pack and a battery charger stand for recharging a battery in the battery pack, the battery pack comprising:
an induction coil; and
the battery rechargeable by electric power induced to the induction coil,
wherein the battery charger stand is capable of recharging the battery contained in the battery pack when a mobile electronic equipment which contains the battery pack is detachably placed on the battery charger stand,
wherein the battery charger stand is so constructed and arranged that a bottom surface of a mounting portion is a curved bottom surface being curved in a U-grooved shape and that a primary coil electromagnetically coupled to the induction coil of the battery pack is incorporated inside the curved bottom surface, with the primary coil being connected to an electric power source,
wherein the battery pack is so constructed and arranged that a rear surface thereof to be placed on the mounting portion of the battery charger stand is a curved rear surface being in a curved shape of matching with the curved bottom surface being U-grooved and that the induction coil is incorporated inside the curved rear surface, and
wherein when the battery pack is placed on the mounting portion, the electric power is carried from the primary coil to the induction coil being electromagnetically coupled with each other, and the battery contained in the battery pack is recharged by the electric power being induced to the induction coil.

26. A battery pack and a battery charger stand for recharging a battery in the battery pack, the battery pack comprising:
an induction coil; and
the battery rechargeable by electric power induced to the induction coil,
wherein the battery charger stand is capable of recharging the battery contained in the battery pack when the battery pack is detachably placed on the battery charger stand,
wherein the battery charger stand is so constructed and arranged that a bottom surface of a mounting portion is a curved bottom surface being curved in a U-grooved shape and that a primary coil electromagnetically coupled to the induction coil of the battery pack is incorporated inside the curved bottom surface, with the primary coil being connected to an electric power source,
wherein the battery pack is so constructed and arranged that a rear surface thereof to be placed on the mounting portion of the battery charger stand is a curved rear surface being in a curved shape of matching with the curved bottom surface being U-grooved and that the induction coil is incorporated inside the curved rear surface, and
wherein when the battery pack is placed on the mounting portion, the electric power is carried from the primary coil to the induction coil being electromagnetically coupled with each other, and the battery contained in the battery pack is recharged by the electric power being induced to the induction coil.

27. The battery pack and the battery charger stand as recited in claim 25, wherein the induction coil is a coil wound on a curved surface matching with the curved rear surface.

28. The battery pack and the battery charger stand as recited in claim 25, wherein the mobile electronic equipment is covered with a detachable cover, and the mounting portion of the battery charger stand is internally profiled to enable the mobile electronic equipment covered with the cover to be placed thereon.

29. The battery pack and the battery charger stand as recited in claim 25, wherein the battery pack incorporates the induction coil wound in a state of a curved surface matching with the curved rear surface, and the induction coil is in a loop elongated in a longitudinal direction of the curved bottom surface being curved in the U-grooved shape.

30. The battery pack and the battery charger stand as recited in claim 25, wherein the battery charger stand has an upper casing defining the mounting portion, and the bottom surface of the mounting portion at the upper casing is a curved bottom surface being curved in a U-grooved shape.

31. The battery pack and the battery charger stand as recited in claim 25, wherein the primary coil is a flat coil wound in a planar state and is wound in a loop elongated in the longitudinal direction of the U-shaped groove so as to enable the electric power to be carried to an area elongated along the longitudinal direction.

32. The battery pack and the battery charger stand as recited in claim 26, wherein the induction coil is a coil wound on a curved surface matching with the curved rear surface.

33. The battery pack and the battery charger stand as recited in claim 26, wherein the battery pack incorporates the induction coil wound in a state of a curved surface matching with the curved rear surface, and the induction coil is in a loop elongated in a longitudinal direction of the curved bottom surface being curved in the U-grooved shape.

34. The battery pack and the battery charger stand as recited in claim 26, wherein the battery charger stand has an upper casing defining the mounting portion, and the bottom surface of the mounting portion at the upper casing is a curved bottom surface being curved in a U-grooved shape.

35. The battery pack and the battery charger stand as recited in claim 26, wherein the primary coil is a flat coil wound in a planar state and is wound in a loop elongated in the longitudinal direction of the U-shaped groove so as to enable the electric power to be carried to an area elongated along the longitudinal direction.

36. A battery charger stand for recharging a mobile electronic equipment, the mobile electronic equipment comprising:
an incorporated induction coil; and
an incorporated battery rechargeable by electric power being induced to the induction coil,
the battery charger stand recharging the battery contained in the mobile electronic equipment when the mobile electronic equipment is detachably placed on the battery charger stand,
wherein the battery charger stand is so constructed and arranged that a bottom surface of a mounting portion is a curved bottom surface being curved in a U-grooved shape and that a primary coil electromagnetically coupled to the induction coil of the mobile electronic equipment is incorporated inside the curved bottom surface, with the primary coil being connected to an electric power source,
wherein the mobile electronic equipment is so constructed and arranged that a rear surface thereof to be placed on the mounting portion of the battery charger stand is a curved rear surface being in a curved shape of matching with the curved bottom surface being U-grooved and that the induction coil is incorporated inside the curved rear surface, and
wherein when the mobile electronic equipment is placed on the mounting portion, the electric power is carried from the primary coil to the induction coil being electromagnetically coupled with each other, and the battery contained in the mobile electronic equipment is recharged by the electric power being induced to the induction coil.

37. A battery charger stand for recharging a battery in a battery pack, the battery pack comprising:
an induction coil; and
the battery rechargeable by electric power induced to the induction coil,
wherein the battery charger stand is capable of recharging the battery contained in the battery pack when a mobile electronic equipment which contains the battery pack is detachably placed on the battery charger stand,
wherein the battery charger stand is so constructed and arranged that a bottom surface of a mounting portion is a curved bottom surface being curved in a U-grooved shape and that a primary coil electromagnetically coupled to the induction coil of the battery pack is incorporated inside the curved bottom surface, with the primary coil being connected to an electric power source,
wherein the battery pack is so constructed and arranged that a rear surface thereof to be placed on the mounting portion of the battery charger stand is a curved rear surface being in a curved shape of matching with the curved bottom surface being U-grooved and that the induction coil is incorporated inside the curved rear surface, and
wherein when the battery pack is placed on the mounting portion, the electric power is carried from the primary coil to the induction coil being electromagnetically coupled with each other, and the battery contained in the battery pack is recharged by the electric power being induced to the induction coil.

38. A battery charger stand for recharging a battery in a battery pack, the battery pack comprising:

an induction coil; and the battery rechargeable by electric power induced to the induction coil, wherein the battery charger stand is capable of recharging the battery contained in the battery pack when the battery pack is detachably placed on the battery charger stand, wherein the battery charger stand is so constructed and arranged that a bottom surface of a mounting portion is a curved bottom surface being curved in a U-grooved shape and that a primary coil electromagnetically coupled to the induction coil of the battery pack is incorporated inside the curved bottom surface, with the primary coil being connected to an electric power source, wherein the battery pack is so constructed and arranged that a rear surface thereof to be placed on the mounting portion of the battery charger stand is a curved rear surface being in a curved shape of matching with the curved bottom surface being U-grooved and that the induction coil is incorporated inside the curved rear surface, and wherein when the battery pack is placed on the mounting portion, the electric power is carried from the primary coil to the induction coil being electromagnetically coupled with each other, and the battery contained in the battery pack is recharged by the electric power being induced to the induction coil.

* * * * *